(12) United States Patent  (10) Patent No.: US 7,624,453 B2
Rene et al.  (45) Date of Patent: Dec. 1, 2009

(54) MODULAR GARMENT

(75) Inventors: Frederic Rene, Paris (FR); Xavier Brucker, Paris (FR)

(73) Assignee: Sagem Defense Securite, Paris (FR)

( * ) Notice: Subject to any disclaimer, the term of this patent is extended or adjusted under 35 U.S.C. 154(b) by 37 days.

(21) Appl. No.: 11/810,439

(22) Filed: Jun. 5, 2007

(65) Prior Publication Data

US 2008/0120819 A1 May 29, 2008

(30) Foreign Application Priority Data

Jun. 6, 2006 (FR) .................................. 06 05018

(51) Int. Cl.
*F41H 1/00* (2006.01)
*F41H 1/02* (2006.01)
*A41D 1/04* (2006.01)
*A41D 13/00* (2006.01)

(52) U.S. Cl. .................. 2/2.5; 2/455; 2/456; 2/462; 2/463; 2/464; 2/465; 89/36.05

(58) Field of Classification Search ............. 2/455, 2/456, 459–465, 467, 2.5, 69, 85, 92–95, 2/102, 103, 308, 310, 323, 325, 326–334, 2/337–342, 274, 900, 905; 89/36.05; 224/656
See application file for complete search history.

(56) References Cited

U.S. PATENT DOCUMENTS 5,265,782 A * 11/1993 McNamara ..................... 2/94
5,774,338 A * 6/1998 Wessling, III ............. 361/730
5,831,198 A * 11/1998 Turley et al. ................ 89/1.11
6,826,782 B2 * 12/2004 Jordan ............................. 2/94
2002/0164473 A1 * 11/2002 Buckley ................... 428/308.4
2002/0164474 A1 * 11/2002 Buckley ................... 428/308.4
2002/0189000 A1 * 12/2002 Jordan ............................ 2/102
2007/0152636 A1 * 7/2007 Nollet ......................... 320/127
2007/0160900 A1 * 7/2007 Nollet .......................... 429/50
2007/0194884 A1 * 8/2007 Didier et al. ................ 340/5.82
2008/0151494 A1 * 6/2008 Besold et al. ............... 361/690
2008/0229823 A1 * 9/2008 Beitia ....................... 73/504.12
2008/0263232 A1 * 10/2008 Guillot et al. ................. 710/11

FOREIGN PATENT DOCUMENTS

WO WO 97/27442 A 7/1997
WO WO 01/95751 A 12/2001
WO WO 2004/010806 A 2/2004

* cited by examiner

*Primary Examiner*—Bobby H Muromoto, Jr.
(74) *Attorney, Agent, or Firm*—McDonnell Boehnen Hulbert & Berghoff LLP

(57) ABSTRACT

The present invention is a modular garment having: a thick and relatively inflexible protective first garment, intended for optional wear; and an electronic garment having a flexible central part at the back and two side parts; the width of the central part is adjustable so that it can be made narrow or wide (depending on whether the electronic garment is worn on its own or over the first garment); several electrical and/or electronic devices are supported by the side parts; and at least one electrical cable runs across the inside face of the electronic garment between the electrical devices, the at least one electrical cable being attached to the side parts without being attached to the central part in front of which it runs freely along a curved path so as to be able to adapt to the modifications in the width of the central part.

7 Claims, 5 Drawing Sheets

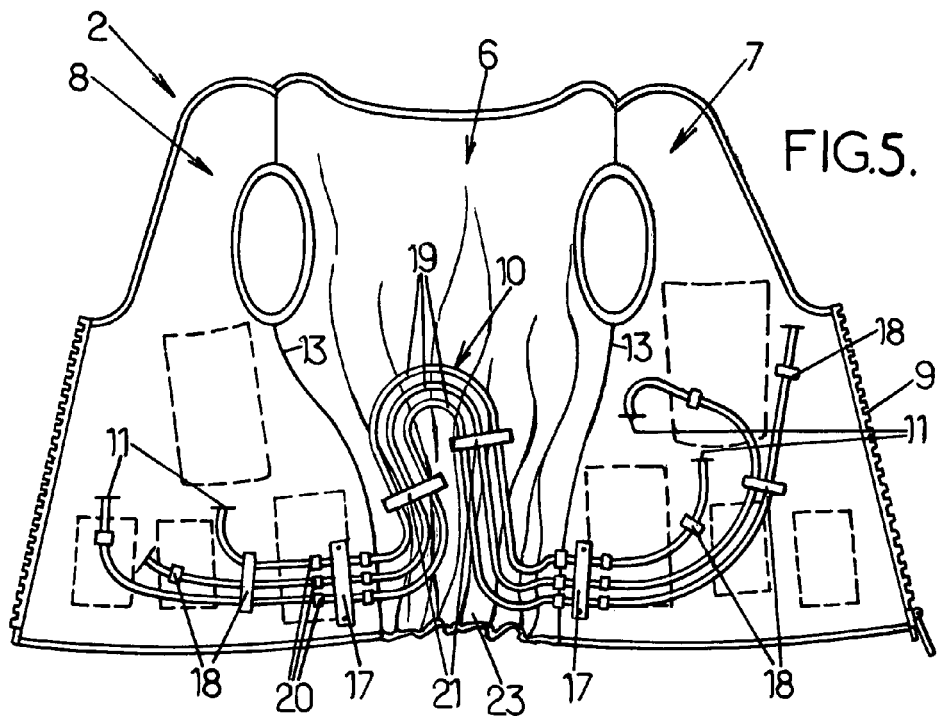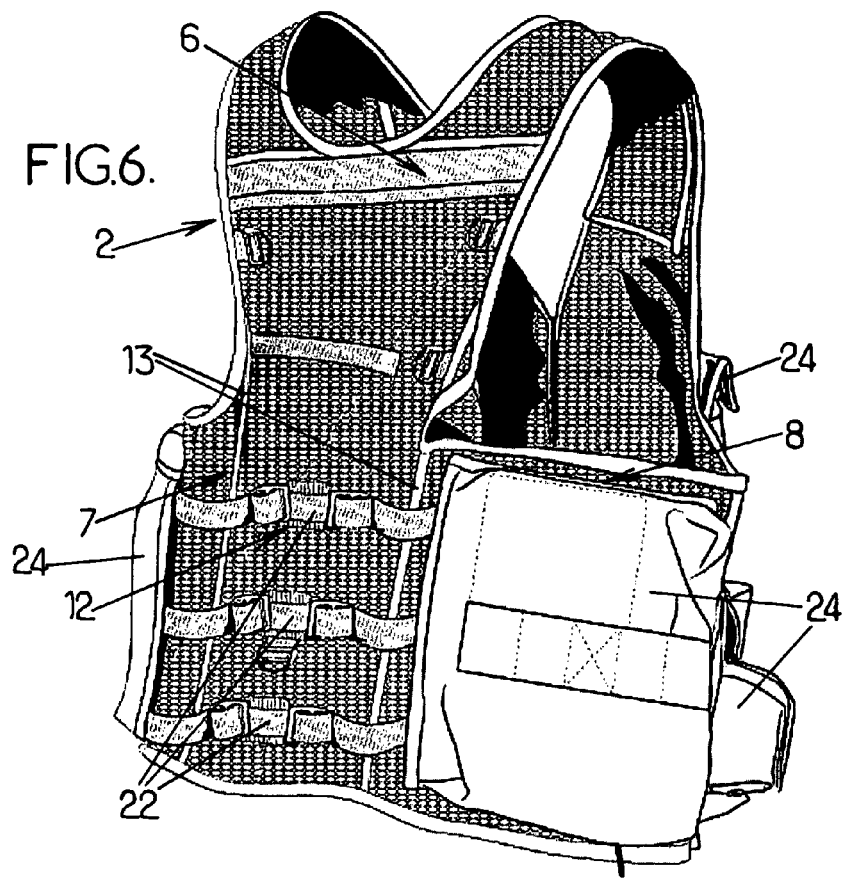

MODULAR GARMENT

BRIEF DESCRIPTION OF THE INVENTION

The present invention relates in a general way to the field of specialized garments for certain professionals.

BACKGROUND OF THE INVENTION

In the exercise of their functions, certain professionals need electronic and/or computational equipment which, together with the corresponding electrical power supply (the battery), they have to wear, preferably in such a way as to leave their hands free. It is known in the prior art to place this equipment in bags or pouches fixed removably to predetermined locations on the garment, but also to provide the garment with multiple pockets suitable for holding the various items, these bags and/or pockets being arranged at various positions on the garment in such a way that the weight of the equipment is distributed and thus easier to carry. Various different forms of specialized garment designed for this purpose are known: see for example documents U.S. Pat. No. 5,831,198, U.S. Pat. No. 5,265,782; also, document FR 05 05821 by the Applicant Company discusses such a garment. For simplicity, this text will refer to this type of garment as an electronic garment.

However, the electrical and/or computational interconnection of equipment distributed in differing locations on the garment is a problem with this type of garment. In known specialized garments, these electrical and/or computational interconnections between the items are adapted to the exact configuration of the garment; in other words, for example, garments of the same type but made for different sizes are given interconnections of appropriate different lengths.

In at least some circumstances, these professionals may also need to wear a specialized garment such as a protective garment (e.g. for thermal protection, ballistic protection and/or protection against edged weapons, etc.) while simultaneously wearing their specialized electrical and/or computational garment. Although the function of such a garment may not be to protect, for simplicity this text will refer to it as a protective garment. Wearing a protective garment of this kind is a serious problem because it is usually thick and relatively inflexible, so that at first sight it would not seem feasible to wear it together with an electronic garment.

To these considerations should be added the fact that the user must have permanent immediate access to at least the majority of the electronic and/or computational devices he is carrying.

Lastly, it should also be observed that, in at least some areas of use of such garments (principally the army and the police), both the protective garment and more especially the heavy electronic garment must fit the user exactly so that he or she can run or make sudden movements (such as dropping to the floor or standing up) without the equipment shifting about and possibly making a noise.

SUMMARY OF THE INVENTION

It is in this context that the invention provides an improved form of modular garment able to meet the abovementioned diverse requirements of professionals.

To these ends, a modular garment arranged in accordance with the invention comprises:

a thick and relatively inflexible first garment or protective garment, intended for optional wear, and a second garment or electronic garment consisting of three parts joined together, namely a relatively flexible central part at the back and two side parts that join releasably at the front, said electronic garment being suitable for wearing either on its own or over said first garment, adjustment means operationally connected to said central part and suitable for modifying the width thereof so as to make it narrow when said electronic garment is worn on its own, or wide when said electronic garment is worn over said first garment, at least two electrical and/or electronic devices supported respectively on said side parts of said electronic garment, and at least one electrical cable running across the inside face of said electronic garment between at least said two electrical devices, said cable being attached to said side parts of said electronic garment and not being attached to said central part of said electronic garment in front of which it runs freely along a curved path enabling it to adapt to changes in the width of said central part arising from the different ways in which said electronic garment can be worn.

The modular garment arranged in accordance with the invention simultaneously meets all the requirements that occur in practice because the width adjustability provided by the central part enables the electronic garment to adapt to being worn directly or worn over the protective garment. The two functions of protection and carrying equipment can thus be separated and the protective garment need only be worn when necessary, thus improving user comfort especially in hot and/or humid environments. Moreover, this same adjustability means that in both configurations the electronic garment can be adjusted to closely fit the torso of the user so that the equipment is held securely and cannot shake about and make a noise. The fact that when the protective garment is required, the electronic garment is worn on top of it, leaves direct and immediate access to the electronic and/or computational devices, which is what users want.

Preferably, two means of attaching the cable to the two side parts of the garment are located at least approximately at the respective joins between the central part and the side parts of the garment, so that the cable is held securely either side of and as close as possible to the central part, while running freely across said central part.

In practice, several cables will typically be provided for all the necessary interconnections and at least the two attachment means are therefore shaped to hold the cables side by side in a flat harness at least in front of the central part of the garment, in order to prevent the cables from lying on top of each other and becoming uncomfortable for the user. The attachment means may be of any appropriate design, so for example they may be flat clamps suitable for the largest-diameter cable; such an arrangement offers the further advantage of allowing axial relative movements by the smaller-diameter cables and therefore not making the garment too stiff. However, it is advantageous to provide stop means on the cables on either side of the respective attachment means in such a way as to limit the amplitude of the axial relative movements of the cables. It is also desirable that, between the two abovementioned cable attachment means, in front of the central part of the garment, there should be at least one unattached assembly member, not attached to the garment, to help keep the cables side by side in a flat harness.

To ensure that the central part of the garment is free to deform when its width is adjusted, despite the presence of the cable, or more generally of the harness of interconnecting cables, it is desirable that the or each cable be curved into an S or Ω shape in front of the central part of the garment.

To facilitate the use of the electronic garment and ensure that cables do not become snagged when the garment is being put on, for example, it is desirable that the central part of the garment comprise a flexible lining (e.g. in the form of an open-mesh fabric) covering the cable or cables.

A modular garment arranged in accordance with the invention is able to meet the requirements of a range of professionals needing to use electronic and/or computational equipment carried in difficult conditions, such as when filming with a digital video camera (since the memories, batteries and sound recording equipment are carried in the electronic garment) in an extreme thermal environment, either cold (a garment to protect against cold) or hot and/or humid (a garment to protect against heat, possibly with built-in cooling). However, one application more especially envisaged for the modular garment of the invention relates to the armed forces and armed police, where the protective garment will be a ballistics vest (for protection against handguns and/or edged weapons).

BRIEF DESCRIPTION OF THE DRAWINGS

A clearer understanding of the invention will be gained from reading the following detailed description of certain preferred embodiments, mentioned purely as non-restrictive examples. This description refers to the accompanying drawings, in which:

FIG. 5 is a highly diagrammatic view showing the front of the electronic garment in the functional configuration seen in FIG. 4; and FIG. 6 is a three-quarter rear view of a variant of the electronic garment arranged in accordance with the invention.

DETAILED DESCRIPTION OF THE INVENTION

In the description which follows, the invention will be described more specifically in its application to the armed forces and armed police, which is a preferred application even if it is not an exclusive one.

To achieve the objects set out above, the invention provides a modular garment comprising a first garment or protective garment, hereinafter denoted as a whole by the reference number 1, and a second garment or electronic garment, hereinafter denoted as a whole by the reference number 2.

Figure 1:
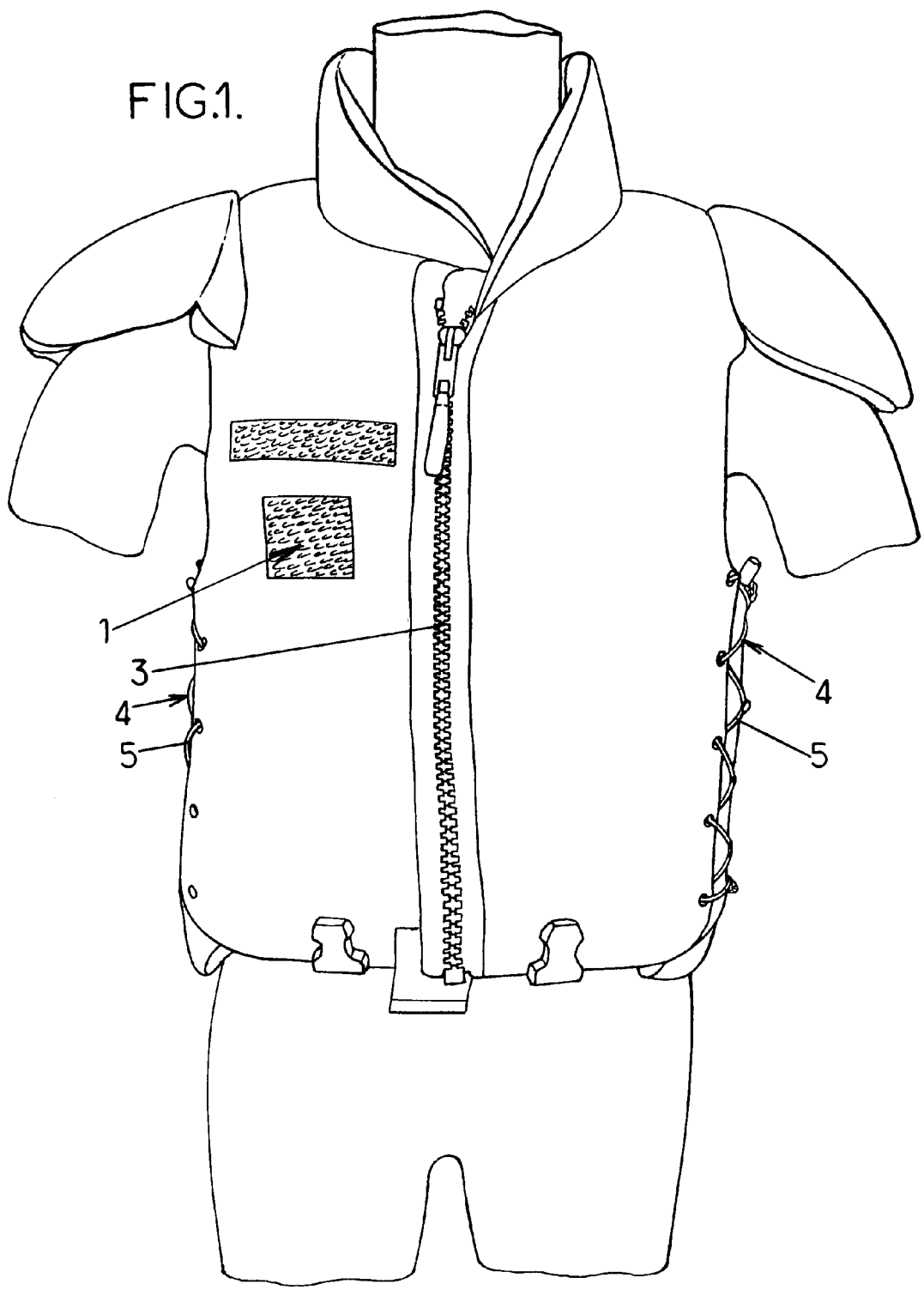
FIG. 1 is a front view of an example of a protective garment intended for optional wear, designed to be worn as the first garment.

Referring initially to FIG. 1, this shows an example of a first garment or protective garment denoted as a whole by the reference 1 (the drawing shows a ballistics vest for protection against handguns and edged weapons, although in other applications it could be a thermal garment giving protection against cold or heat). Such a garment is thick and relatively inflexible; in the case of the ballistics vest, it is hot, which is a real problem in hot environments. Such a garment is not therefore intended to be worn permanently and is put on only when necessary, in which case it is worn as a first garment or undergarment.

In the example illustrated, the protective garment 1 may be a sleeveless vest which opens and closes 3 at the front. However, this protective garment may be of any configuration and any construction appropriate for its function, the configuration and construction not coming directly within the scope of the invention. It is however relevant to point out that the protective garment 1 has means of adjustment 4 in the form of for example one or more laces 5 which may be situated on the side, to allow the garment to be adjusted tightly to the wearer's torso so that the garment does not "float".

Figure 2A:
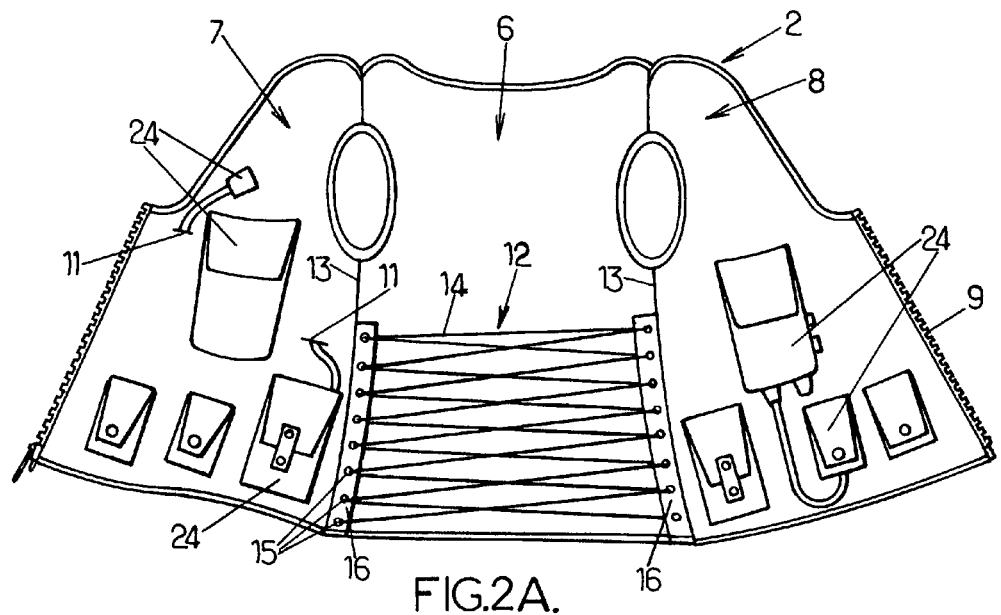
FIGS. 2A and 2B are highly diagrammatic views of the front and back, respectively, of an electronic garment constructed in accordance with the invention and laid out in a first functional configuration.
Figure 2B:
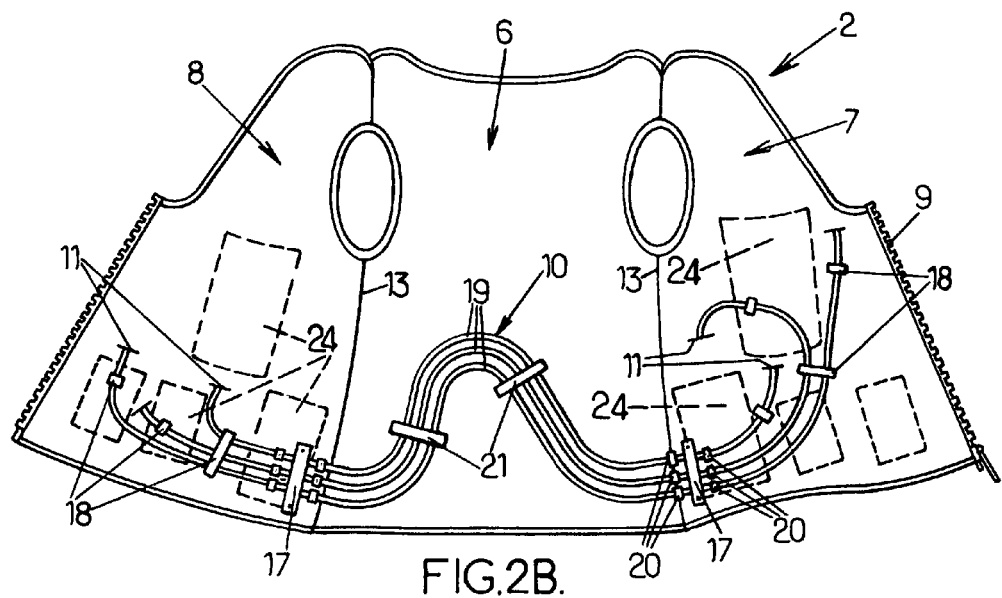

Turning now to FIGS. 2A and 2B, these show in highly diagrammatic form an example of a second garment or electronic garment 2 constructed in accordance with the invention. This garment is in the general form of a vest, that is a sleeveless garment, suitable for wearing over clothes as will be explained below. In FIGS. 2A and 2B, first the front (the visible outside face) is shown, and then the reverse (the visible inside face).

The garment 2 basically consists of three parts joined together, namely a relatively flexible central part 6 at the back and two side parts 7, 8 that join releasably at the front (e.g. with a zip 9).

Only the side parts 7, 8 are designed to carry multiple electronic and/or computational devices 24 required by the user for multiple functions, the devices being laid out at multiple locations so that the weight is distributed and easier to carry. These devices are those required by the user for the exercise of his function. A serviceman, for example, may require a central data-processing unit for centralization of information, a transmitter/receiver for remote communications, a navigation device, a fire control device, connectors for hooking up head-mounted devices (microphone and earpieces, a night-vision device) and for connecting to a weapon with an electronic sight, etc.; in addition to which there is of course also an independent power source (batteries).

In order to be able to carry such loads, the side parts 7, 8 of the garment are reinforced and therefore cannot be highly flexible.

On the other hand, the central part 6 is not carrying any equipment and can therefore be very flexible. The invention exploits this fact, as will be described later.

The garment can be made of any desired material, preferably fabric, and the fabric may optionally be different for the central part 6 and the side parts 7, 8. In practice, the garment 2, not having other functions such as protection to provide, can, and preferably should, be designed to inconvenience the wearer as little as possible. It may therefore advantageously be made entirely of a mesh fabric, mechanically strong but well ventilated, and the side parts 7, 8 can be reinforced mechanically wholly or partly with (metallic or plastic) reinforcements to support the equipment.

As FIGS. 2A and 2B show, the equipment is housed in pockets belonging to the garment 2 and/or in pouches attached—optionally removably—to the garment 2.

For the electronic and computational operational interconnections between the various devices, cables are provided and, so as not to inconvenience the user, these cables 10 are attached to the inside face of the garment 2 as shown in FIG. 2B, the ends of the cable or cables reaching the respective devices through buttonholes 11 made in the garment.

So that the user can carry out his functions, he has to wear the electronic garment 2. But the protective garment 1, which is more constricting, remains optional and need only be worn in case of necessity, as indicated earlier.

The electronic garment 2 must also be adjusted to the user's torso to ensure that the equipment does not get knocked accidentally, to prevent rattling, and to ensure that the garment does not catch on other objects.

It is also important for the user always to have rapid access to the equipment he is wearing.

For these various reasons it is essential that the electronic garment 2 always be on the outside, whatever other equipment the user may have about him. In other words, when the user is equipped with his protective garment 1, the electronic garment 2 must be worn on top of it while the electronic garment 2 can be worn on its own; and in either case the electronic garment 2 must be adjusted to closely fit the user's torso despite the possible presence of the considerable extra thickness of the protective garment 1, when this is worn.

In view of these considerations, the invention provides that the electronic garment 2 is of adjustable width, for which purpose it makes use of the flexibility of the central part 6 of the electronic garment 2. To this end the electronic garment 2 is provided, e.g. on the outside of it, as shown in FIG. 2A, with width-adjusting means 12. These width-adjusting means 12 are connected to the respective two edges of the central part 6 by which they attach to the respective side parts 7, 8; in the example illustrated they are connected to the joins 13 between the central part and the side parts of the garment.

These adjustment means may take any form provided they allow the desired adjustment of the width of the central part 6 of the electronic garment.

As an example, on FIG. 2A said adjustment means 12 are shown as comprising at least one lace 14 passing in zigzags through eyelets 15 inserted in two strips 16 of fabric connected to the abovementioned joins 13 between the central part 6 and the side parts 7, 8 of the electronic garment. The width is then adjusted by tightening or slackening the lace 14.

However, the cable or cables 10 present on the inside reverse of the electronic garment must, while being attached to the garment, be able to adapt to the dimensional variations of the width of the central part 6. To this end the invention provides, as illustrated in FIG. 2B, that the cable or cables 10 be attached only to the side parts 7, 8 of the electronic garment and not be attached to the central part 6 in front of which they run freely, following a curved path, typically in an S or Ω shape so that they are able to adapt to changes in the width of said central part 6. This S or Ω shape is obtained by making the length of cable running in front of the central part 6 of the garment 2 much longer than said central part 6 of the garment 2 is wide.

Two members 17 (in the form of clamps, for example) are provided to attach the cable or cables 10 to the respective side parts 7, 8 of the garment. These members 17 are positioned at least approximately at the respective joins 13 between the central part and the side parts of the garment or in their immediate vicinity. Also, depending on their length, the various cables are attached along their respective paths to the side parts 7, 8 of the garment by clasps 18 which may either be individual, or shared by several cables side by side. If desired, the attachment members 17, and the clasps 18 if necessary, may be made in the form of fabric strips folded back on themselves to form loops.

It will be appreciated that in practice, in view of the number of interconnected devices supported by the electronic garment 2 at disparate locations on the latter, the cables include several cables 19 running between the side parts 7, 8. To ensure that two or more cables 19 do not lie on top of each other and become uncomfortable for the user, at least the two abovementioned attachment members 17 are shaped to hold the cables 19 side by side in a flat harness 10 at least in front of the central part 6 of the electronic garment 2. It is for this reason that the attachment members 17 are preferably flat clamps suitable for the largest-diameter cable. This also gives the further advantage of allowing axial relative movements by the smaller-diameter cables, thus increasing the flexibility of the cable harness.

Advantageously, stop means, e.g. in the form of portions 20 of increased thickness (which may be rings clipped around the cable), are provided on the cables 19 on either side of the respective attachment members 17 in such a way as to limit the amplitude of the axial relative movements of the cables and maintain the cohesion of the S- or Q-shaped cable harness in front of the central part 6 of the garment.

As a further means of keeping the cables in the form of a flat harness throughout its length where it passes in front of the central part 6 of the garment 2, one or more unattached assembly members 21, not attached to the garment 2, are advantageously provided so that the cable harness is kept flat and its ability to deform is not impaired. The assembly members 21 may also be clamps which may be of the same design as the abovementioned attachment members 17, except for the fact that they are not attached.

To protect the cables 10 and in particular prevent it from snagging and possibly being torn away when for example the user is putting the electronic garment 2 on or taking it off, it is preferable to provide a flexible lining covering internally at least the central part 6, and optionally also the side parts 7, 8 of the garment 2.

Figure 3:
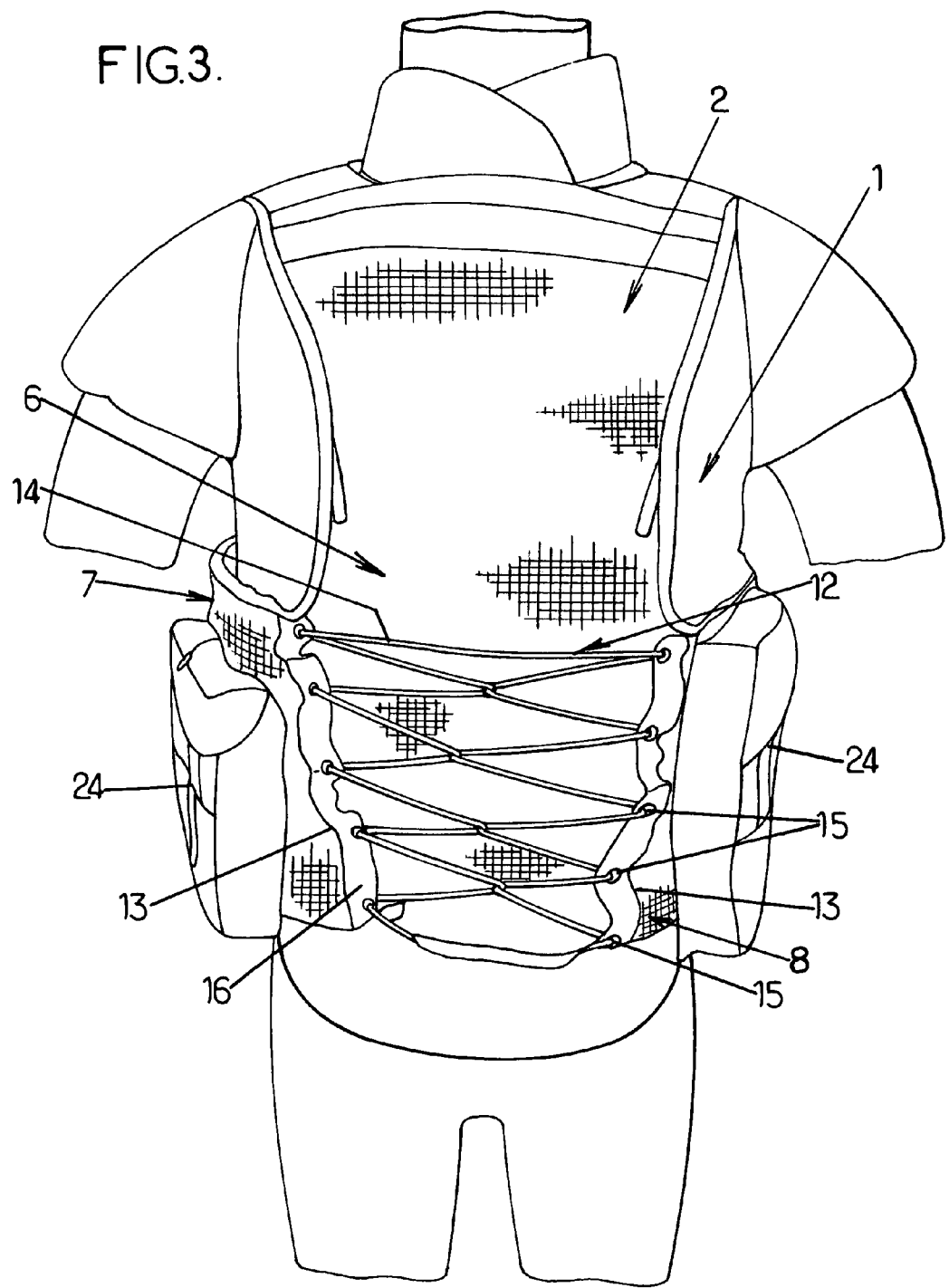
FIG. 3 is a rear view showing the electronic garment laid out in the first functional configuration and worn on top of the protective garment.

As shown in FIGS. 2A and 2B, the lace 14 is loosened and the cables 10 are stretched, making the electronic garment 2 very wide so that it can be worn on top of the protective garment 1 as illustrated, in a rear view, in FIG. 3.

Figure 4:
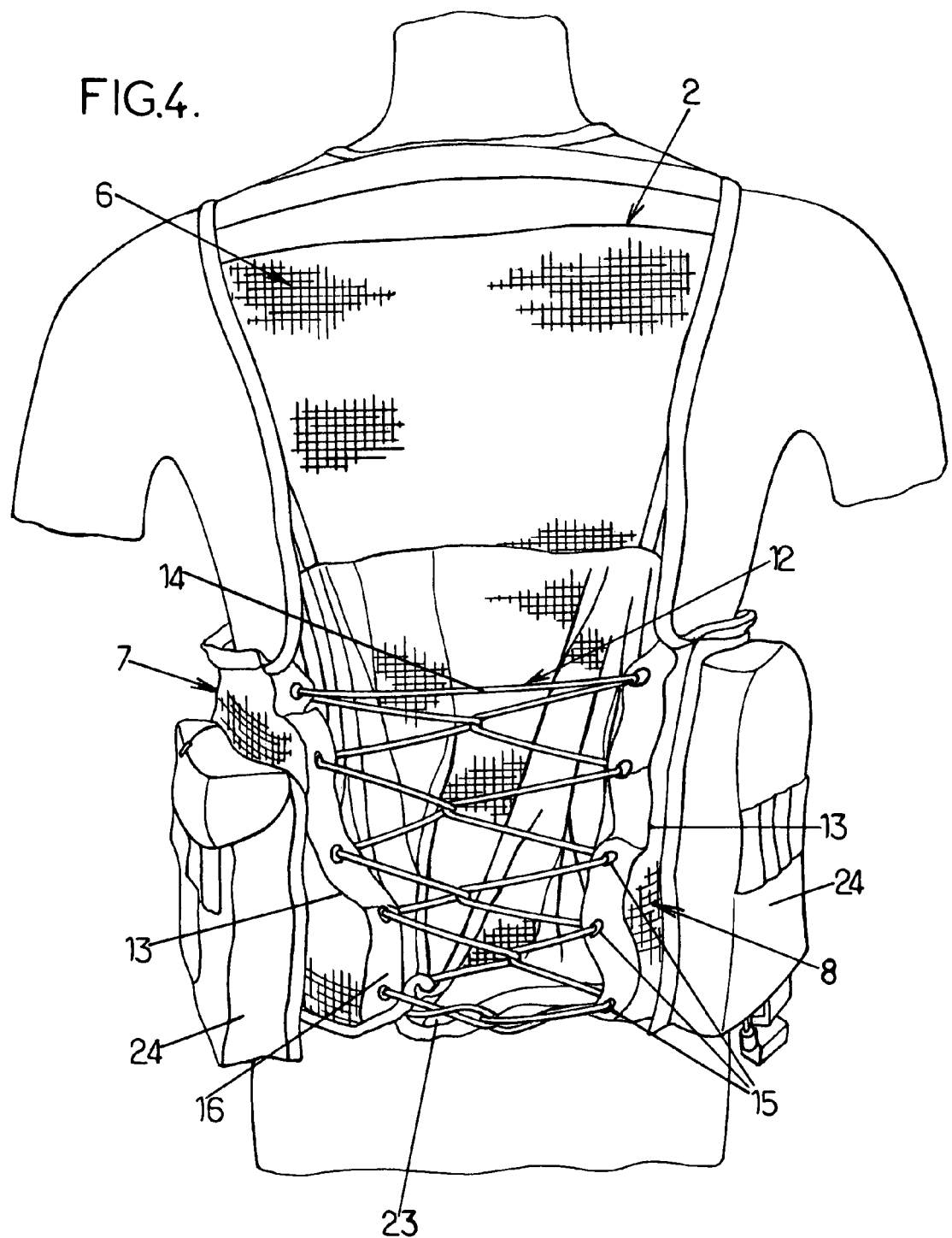
FIG. 4 is a rear view showing the electronic garment in a second functional configuration and worn on its own.

FIG. 4 shows, again in a rear view, the same electronic garment 2, this time worn on its own. To adjust it to the user's torso, the lace 14 has been tightened so that the joins 13 between the central part 6 and the two respective side parts 7, 8 have been drawn together and the fabric in the lower region of the central part 6 has puckered up (at 23).

In this arrangement, as shown diagrammatically in FIG. 5 depicting the front face of the garment 2, the cables 10, between the attachment members 17 in front of the central part 6 of the garment 2, have arched up without difficulty owing to the S or Ω shape imposed on them.

FIG. 6 illustrates, in a three-quarter rear view, an alternative physical embodiment of an electronic garment 2 in which the adjustment means 12 are formed of a number of straps 22 arranged one above the other, each strap 22 having a buckle with which to modify its length.

As will have been clear from the above explanations, the practical implementation of the provisions of the invention may give rise to numerous variants, particularly according to the applications envisaged for this modular garment, and according to the available materials, etc.

What is claimed is:

1. A modular garment assembly comprising:
    a thick and relatively inflexible first garment or protective garment, and
    a second garment or electronic garment consisting of a relatively flexible central part at the back and two side parts that join releasably at the front with said three parts being joined together, said electronic garment being suitable for being worn over said first garment,
    adjustment means operationally associated to said central part and suitable for modifying the width thereof so as to make said central part narrow or wide when said electronic garment is worn over said first garment, wherein the adjustment means are suitable for at least two electrical and/or electronic devices supported respectively on said side parts of said electronic garment, at least one electrical cable running across the inside face of said electronic garment between at least said two electrical devices, and attachment means for attaching said at least one electrical cable only to said side parts of said electronic garment and not to said central part of said electronic garment in front of which said at least one electrical cable runs freely along a S or Ω curved path so as to be free to adapt to changes in the width of said central part arising from the different ways in which said electronic garment can be worn.

2. The garment assembly according to claim 1, wherein two attachment means of attaching said at least one electrical cable to said two side parts of said electronic garment are located at least approximately at respective joins between said central part and said side parts of said electronic garment.

3. The garment assembly according to claim 2, wherein several cables are provided, and wherein at least said two attachment means are shaped to hold said cables side by side in a flat harness at least in front of said central part of said electronic garment.

4. The garment assembly according to claim 3, wherein said attachment means are flat clamps suitable for the largest-diameter cable, whereby axial relative movements by the smaller-diameter cables are allowed.

5. The garment assembly according to claim 2, wherein stop means are provided on said at least one electrical cable on either side of said respective attachment means in such a way as to limit the amplitude of axial relative movements of said at least one electrical cable.

6. The garment assembly according to claim 1, wherein said central part of said electronic garment comprises a flexible lining covering said at least one electrical cable.

7. The garment assembly according to claim 1, wherein said first garment is a ballistics vest.

* * * * *